United States Patent [19]
Dückinghaus

[11] Patent Number: 4,947,948
[45] Date of Patent: Aug. 14, 1990

[54] CONTROL DEVICE FOR DIFFERENTIAL SPEED STEERING OF A VEHICLE

[75] Inventor: Heinrich Dückinghaus, Bielefeld, Fed. Rep. of Germany

[73] Assignee: Claas OHG, Harsewinkel, Fed. Rep. of Germany

[21] Appl. No.: 381,343

[22] Filed: Jul. 18, 1989

[30] Foreign Application Priority Data

Jul. 28, 1988 [DE] Fed. Rep. of Germany ....... 3825670

[51] Int. Cl.$^5$ .......................................... B62D 11/04
[52] U.S. Cl. ...................................... 180/6.7; 180/132
[58] Field of Search .................................. 180/6.7, 132

[56] References Cited

U.S. PATENT DOCUMENTS

| | | | |
|---|---|---|---|
| 3,530,964 | 9/1970 | Maguire | 180/6.7 |
| 3,540,220 | 11/1970 | Lauck | 180/6.7 |
| 3,776,325 | 12/1973 | Jespersen | 180/6.7 |
| 3,876,021 | 4/1975 | Baumgartner | 180/6.48 |
| 4,299,300 | 11/1981 | Hakes et al. | 180/6.7 |

FOREIGN PATENT DOCUMENTS

2015311 11/1970 Netherlands.
2824448 5/1978 Netherlands.

Primary Examiner—Kenneth R. Rice
Attorney, Agent, or Firm—Browdy and Neimark

[57] ABSTRACT

A control device with a steering control block in which four hydraulic control valves, controllable in pairs by means of a spool valve, together with reversing valves, adjustable by the spool valve, are disposed and are connected with forward and reverse controlling control connectors of a right and a left drive. The spool valve is activated by a steering wheel and a drive lever; the drives are differentially charged in an analog steering sense. The control device is suitable for tracked vehicles.

17 Claims, 8 Drawing Sheets

CONTROL DEVICE FOR DIFFERENTIAL SPEED STEERING OF A VEHICLE

BACKGROUND OF THE INVENTION

1. Field of the Invention

The invention relates to a control device for differential speed steering of a vehicle with an arrangement of four control valves assigned in pairs to respectively two directions of two degrees of freedom, their outputs being connected to control connectors regulating the forward and reverse movements of a right and left driving element by means of respective steering and drive control positions of the spool valve via reversing valves, which cause a steering reversal in the forward-reverse movement sense.

2. The Prior Art

A differential speed steering device is known from German Patent DE-PS No. 25 11 176, in which four controllable valves are arranged around the circumference of a control lever, each one of the two which are arranged opposite to each other serves as forward and reverse control and the other two, being disposed laterally, are used for a differential drive control of a right and left hydraulically operated drive by means of interposed shuttle valves. Operation of the device by means of the steering lever movable in two dimensions considerably differs from the customary steering and speed control by means of two operating elements, which are separately movable in a single dimension, of other types of vehicles. There is the additional disadvantage that in order to move in a tight turn, the reverse movement of the one drive and the simultaneous forward movement of the other drive is only possible by the additional operation of a special reversing valve, which further complicates operation and differs from the usual operation and also results in discontinuous steering and driving operations.

The many diverse steering elements and their connections to each other are complicated and pose increased safety risks. Additionally, straight movement requires constant steering and exact matching of the pressure conditions in the control and reversing valves.

SUMMARY OF THE INVENTION

It is the object of the invention to disclose a control device for differential speed steering which is of simpler construction, is safer, can be operated in accordance with conventional operating techniques and is analogously steerable.

This object is attained in that the spool valve directly operates the reversing valves in accordance with the forward or reverse control position and in that the spool valve can be moved in one of the degrees of freedom by turning a steering wheel and in a second degree of freedom by pivoting of a drive lever.

Advantageous embodiments are described in the dependent claims.

The compact steering block contains the four control valves and the shuttle valves, so that no external lines and line connectors are required for their connection. Additionally, because of their arrangement, the shuttle valves cause a direct reversing operation which, in an advantageous manner, is continuous and operates without additional operating steps. Because the spool valve is moved in two dimensions, it can be operated with a two-dimensionally movable operating element as well as advantageously and in a conventional manner with two separate operating elements, each movable in one dimension.

In an advantageous manner, a cylindrical construction of the interior of the steering block and of the valve slides is provided for reasons of simplified manufacture combined with a high degree of fit of the spool valves, so that the control movements are axially and circularly translating or rotating.

In a preferred embodiment, the conventional rotational steering movement of a steering wheel is translated into an axial control movement via a geared spindle drive, an appropriate reduction taking place so that, for example, after two turns of the steering wheel out of a center position, the maximum steering effect in the desired direction is provided. The pivot movement of a speed and forward-reverse control lever is advantageously translated into circular control positions via a lever arrangement. With a respective selection of the drives between the operating elements and the spool valve it is also possible to select a reversed assignment of the degrees of freedom of control of the spool valve, as can be seen from the two-dimensional control diagram shown in plan view.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which.

DESCRIPTION OF A PREFERRED EMBODIMENT

Figure 1:
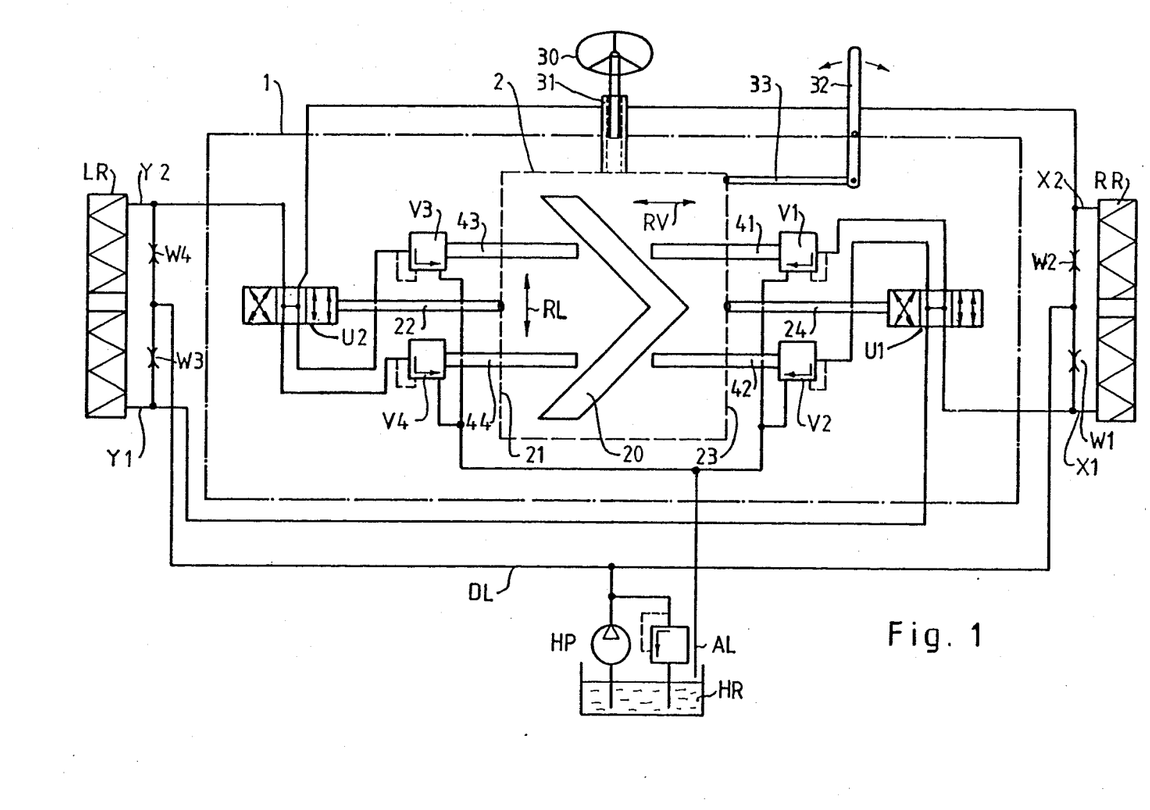
FIG. 1 is a schematic view of the control device in the neutral position.

FIG. 1 illustrates the drive and steering control device in diagram form with operating and driving elements in reduced scale. The spool valve (2), shown in dashed lines, is disposed in the steering block (1), shown in dash-dotted lines, movable in two degrees of freedom. The torsion preventer is not shown. Displacement in the directions (RL) of the first degree of freedom takes place by means of turning the steering wheel (30) via a geared spindle drive (31), and in the directions (RL) of the second degree of freedom, which are oriented vertically with respect to the first direction, displacement takes place by means of a pivotal movement of a drive pivot lever (32) via the linkage (33). Depending on its position, the spool valve (2) acts with the control bar (20) on the tappets (41 to 44) of the four control valves (V1 to V4). Additionally, the spool valve (2), corresponding to the position in the directions (RV), activates the two reversing valves (U1, U2) via the schematically shown coupling elements (21 to 24).

The control device is supplied by a hydraulic pump (HP) via a pressure line (DL) which supplies hydraulic oil of a pre-set pressure via throttles (W1 to W4) to the drives (LR, RR). Spring-loaded differential pressure cylinders, for example, may be connected in pairs with the control connectors (X1, X2; Y1, Y2). The forward control connectors (X1, X2) as well as the reverse control connectors (Y1, Y2) of the right drive (RR) or of the left drive (LR), respectively, are each connected with one of the reversing valves (U1, U2). On the other side, the reversing valves (U1, U2) are assigned to and connected with the four proportional control valves (V1 to V4).

Each of the overflows of the control valves (V1 to V4) is returned to the reservoir (HR) via the outflow line (AL). In the base position of neutral shown, the control bar (20) is disposed without contact with the tappets (41 to 44), so that the control valves (V1 to V4) are in their base position. Additionally, the reversing valves (U1, U2) are in a neutral intermediate position, so that there, too, the flow of hydraulic oil is shut off or evenly distributed, the drives (LR, RR) thus being under the same pressure and therefore stopped. The reversing valves (U1, U2) comprise valve chambers (VK1 to VK4), (see FIG. 7, which, on their output side, are connected with the control valves (V1 to V4) and which lead on their input side to the control connectors (X1, X2; Y1, Y2) in response to a selected forward-reverse control position.

Figure 2:
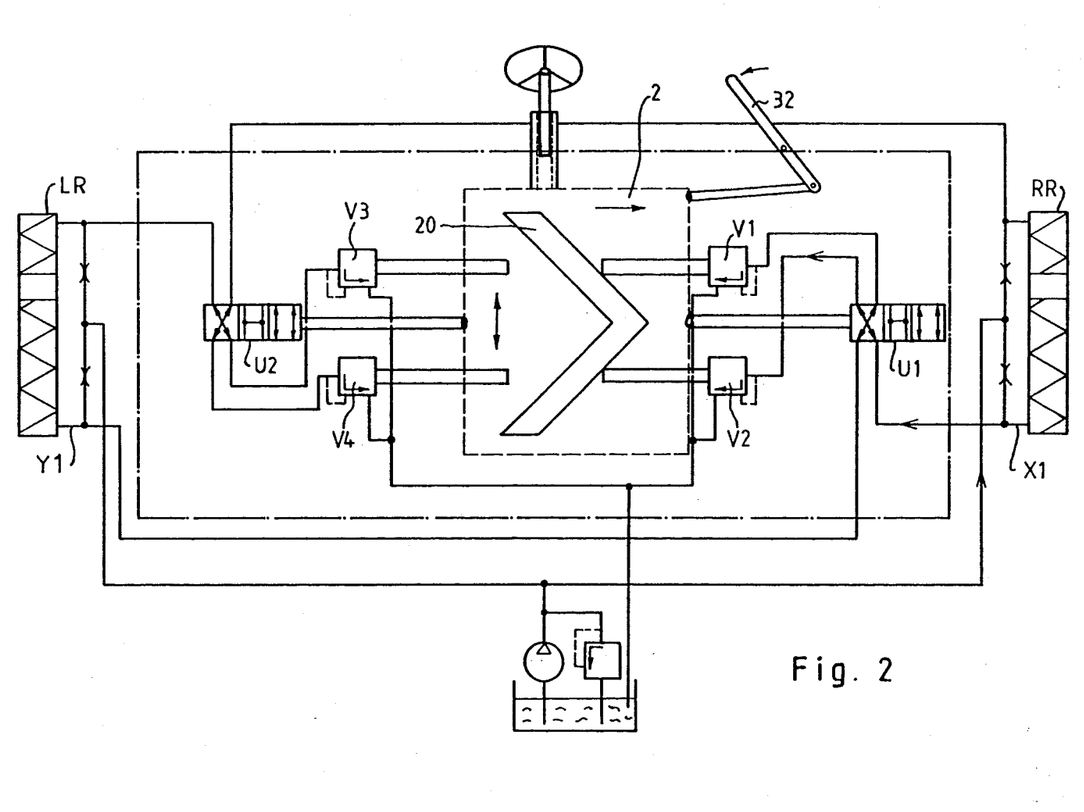
FIG. 2 is a schematic view of the control device in forward operation steering straight ahead.

The same control diagram is shown in FIG. 2 with the drive lever (32) in a position for forward drive. Because of this, the spool valve (2) has contacted the control valves (V1, V2) with the V-shaped control bar (20) and has brought the reversing valves (U1, U2) into a position where the inputs and outputs are cross-connected. In this manner, the hydraulic oil flows via the forward control connectors (X1, Y1) from the two drives (RR, RL) in accordance with the respective control valve opening, so that the drives (RR, RL), thus moving in parallel, drive the vehicle in a forward direction both at the same speed.

Figure 3:
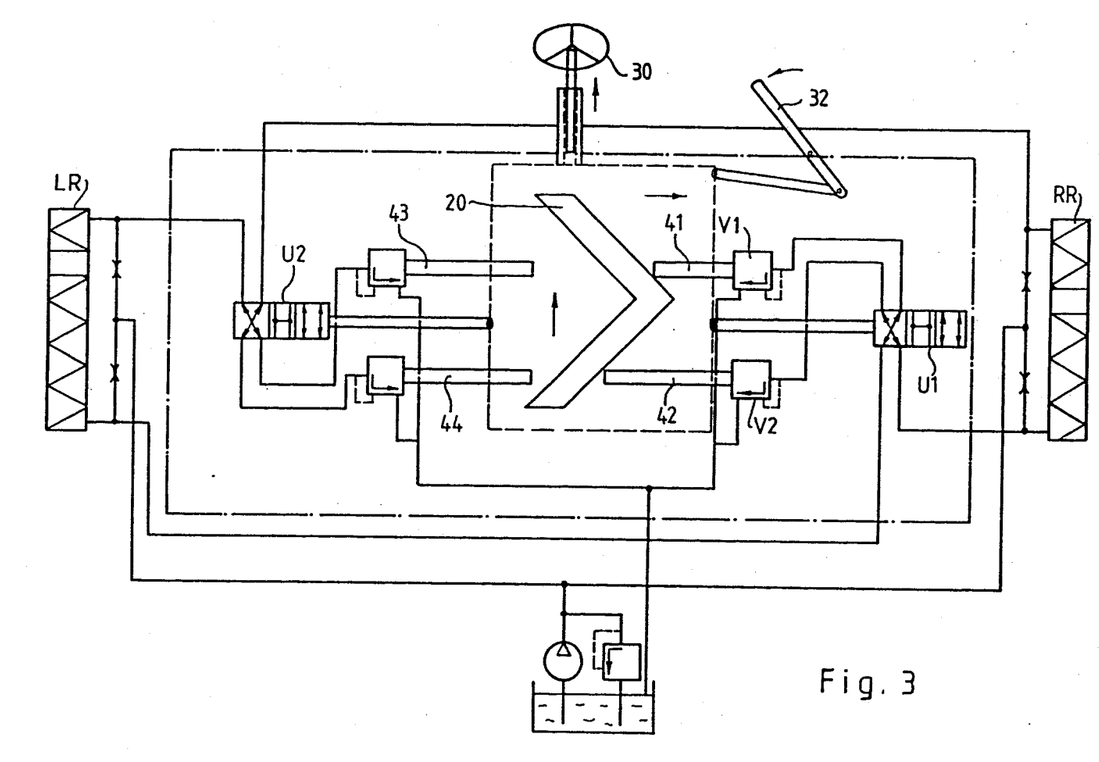
FIG. 3 is a schematic view of the control device in forward operation steering to the right.

In FIG. 3, the control diagram is shown with a greatly pivoted forward position of the drive lever (32), corresponding to fast speed, and with the steering wheel (30) turned to the right, so that because of the V-shape of the control bar (20), the displacement of the forward controlling control valve (V1) of the left drive (LR) causes a pressure increase and the displacement of the corresponding control valve (V2) of the right drive (RR) causes a pressure reduction in the control circuit, so that the vehicle moves to the right, as expected, the speed remaining approximately the same as that during a straight ahead movement with the same position of the drive lever. When the steering wheel is turned in the opposite direction, the opening conditions of the control valves (V1, V2) are reversed and the vehicle accordingly moves in the other direction.

Figure 4:
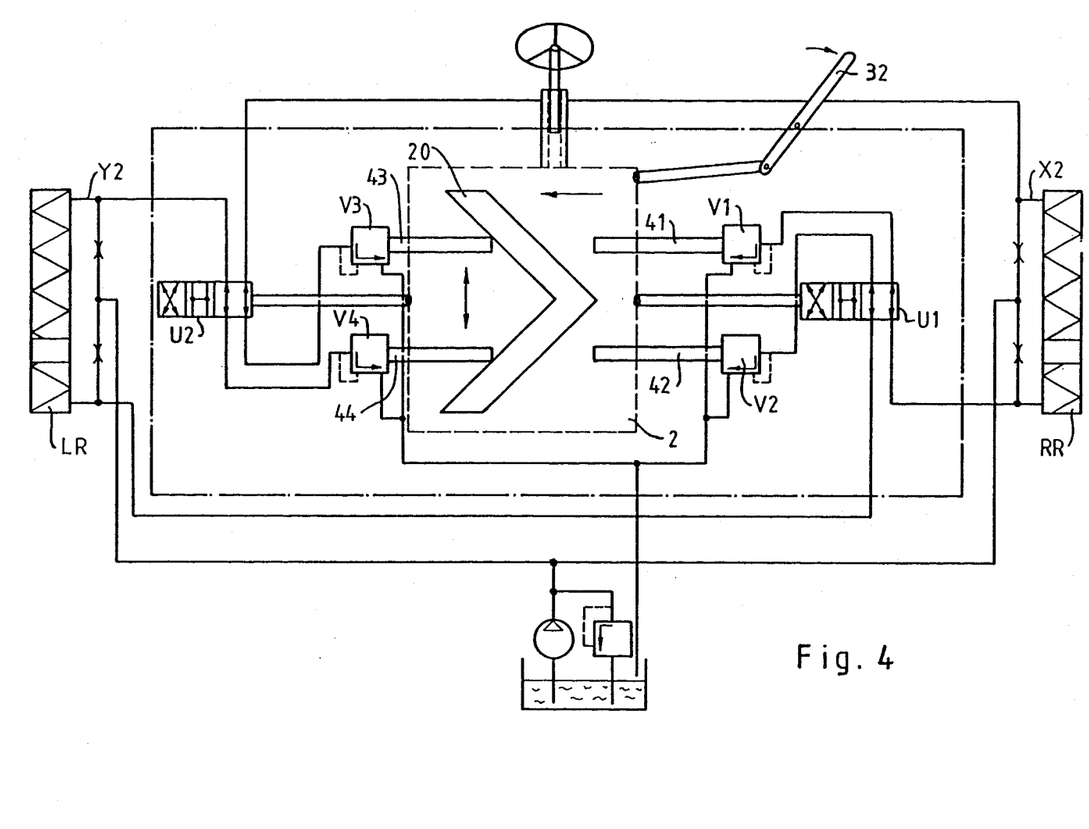
FIG. 4 is a schematic view of the control device in reverse operation steering straight ahead.

If the drive lever (32) is in a reverse position with the steering wheel in the center position, as shown in FIG. 4, the two reverse control valves (V3, V4) cause a pressure increase and the reversing valves (U1, U2) are in a position of parallel flow-through. Because of this the hydraulic oil flows via the reverse control connectors (X2, Y2) of the drives (RR, LR) and controls their reverse movement. If the spool valve (2) is downwardly displaced by a left turning motion of the steering wheel (30), the valve (V3) which charges the right drive (RR) via the reversing valve (U2) is operated with greater force and the other valve (V4) is operated with lesser force, so that the vehicle moves backward while turning to the left. The reversing valves (U1, U2) thus cause conventional analog steering during forward and backward movement.

To the extent that during the forward mode with the steering wheel turned to the right in accordance with FIG. 3, the drive lever (32) is in a lesser pivot position than shown for slower movement, the forward control valve (V1) of the left drive (LR) is only partially actuated, so that a slow turn to the right takes place. By means of a suitable disposition and design of the control bar (20) in relation to the position of the tappets (41 to 44) in connection with the design of the reversing characteristics of the reversing valves (U1, U2), it becomes possible that turning movement with opposite drives takes place in only one of the drive positions and not in the neutral position and an opposite drive operation is only effective in low-speed forward or reverse drive positions. Because of this, excessive lateral stress on the track drives is prevented and the increased power requirements during a short radius turn are advantageously addressed. For this reason, the position change of the reversing valves (U1, U2) takes place over a short neutral area which is shown in the diagram of FIG. 1 and can be more clearly seen from the subsequent figures.

Figure 5:
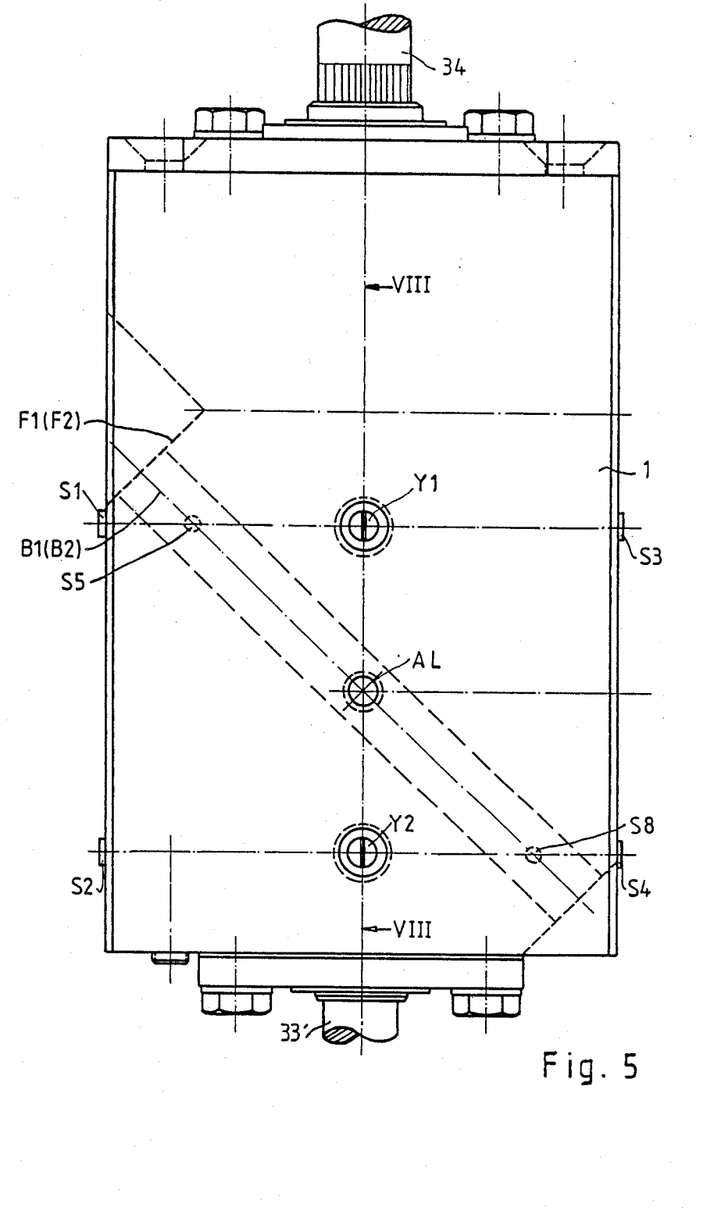
FIG. 5 is a lateral view of the control device.
Figure 6:
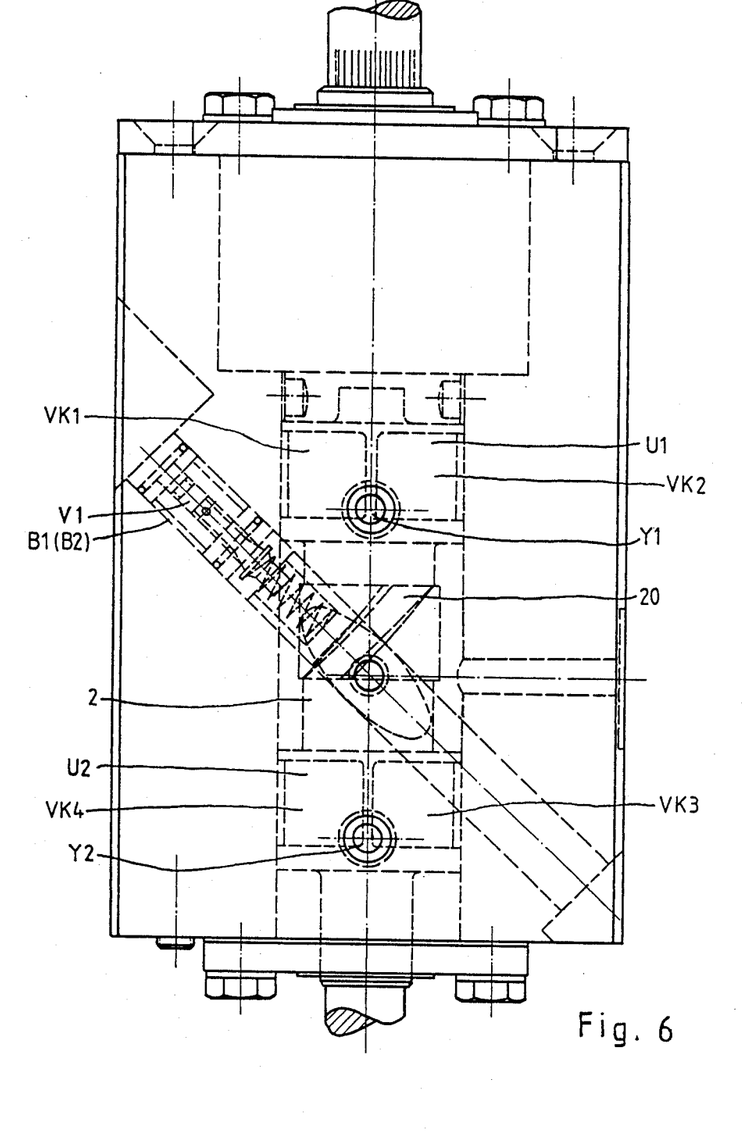
FIG. 6 is a lateral view with interior structures.

FIGS. 5 and 6 show a solidly advantageous design of the control device in a lateral view. The steering block (1) is designed symmetrically and provided with bores which are used to receive the cylindrical spool valve and the valves and form the connecting passages of the hydraulic system as well. At one end the steering column (34) is inserted and fixed axially to the spool valve (2), and at the other end the drive control linkage is attached to the pivot shaft (33') on the spool valve (2) which is sealingly fixed there in the steering block. The hydraulic connections (Y1, Y2) for the left drive are shown in the open position. The two connections for the right drive are located on the opposite side.

From countersunk areas (F1, F2), which are at 45° with respect to the central axis, two bores (B1, B2) have been placed in the recess in front of and behind the central axis, and a control valve has been screwed into each one of the bores (B1, B2) from the side.

FIG. 6 shows in a dashed line the position of a control valve (V1) in the upper bore (B1). Furthermore, the spool valve (2) with one of the helically shaped control bars (20) is shown by dashed lines, which acts frictionally on the spring loaded sleeve-shaped valve tappet of the valves disposed on both sides. The spool valve (2) is shown in the neutral pivot lever position with the steering wheel turned to the extreme as can be seen from the reversing valves (U1, U2) which connect with their control edges their valve chambers (VK1, VK2; VK3, VK4) via the bores of the control connectors (Y1, Y2). The control bars (20) have an incline (I) of 45°; the axes of the bores (B1) are located vertically to the extent of the control bars (20), which results in little wear and easy operation. The pivot angle area of the spool valve (2) is about 30°.

Figure 7:
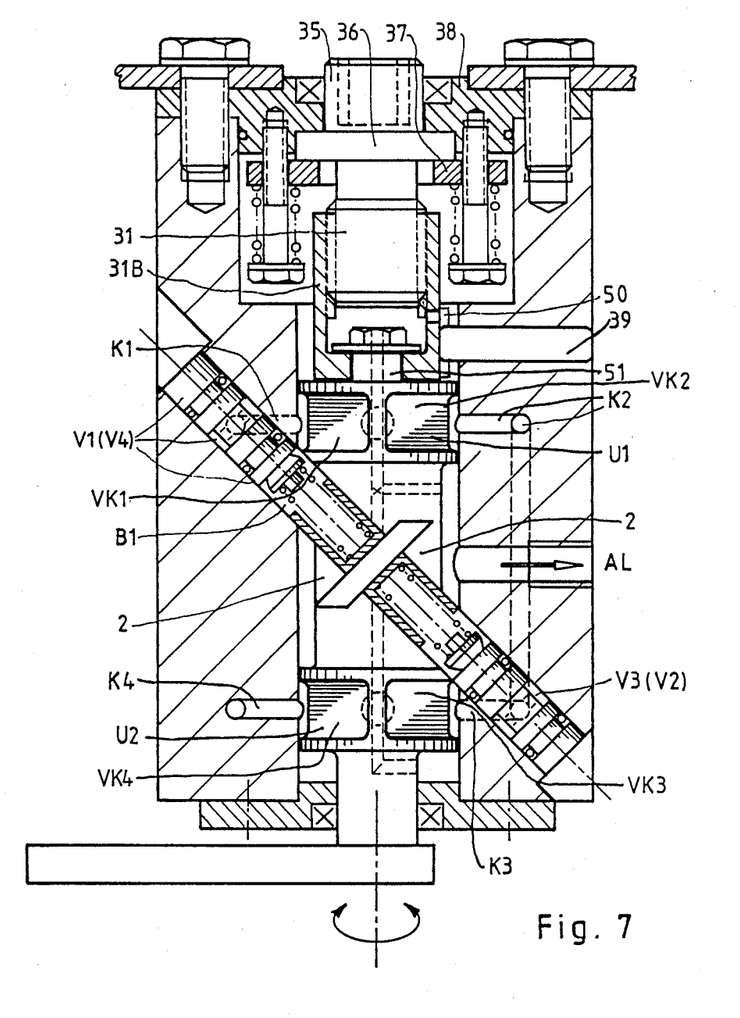
FIG. 7 is an offset section of the steering block with control valves.

FIG. 7 is an offset section through a valve block, so that the control valves (V1, V3) located in the bore (B1) and the spool valve (2), which lies lower, are shown. The spool valve (2) is in the neutral position without the steering wheel being turned. The conduits (K1 to K4), which have been provided in a simple manner by bores closed from the outside and meeting at an angle, connect the visible and not visible valves with the reversing valves (U1, U2).

The geared spindle drive (31) is also shown which translates a turn of the steering wheel into an axial pushing movement of the spool valve (2). The connector (35) of the steering column is supported with an annular collar (36) in the interior of the steering block against the sealed housing lid (38) by means of a spring-loaded annular brake disk (37) so that it can turn stiffly. The screw socket (31B) of the geared spindle drive (31) is secured against turning in an axial groove (50) by means of a pin (39). The spool valve (2) is rotatingly fixed with a stud (51) on the screw socket (31B). In this manner, the degrees of freedom of displacement of the spool valve (2) are clearly assigned to the steering or drive selection.

The various free chambers next to the reversing valves (U1, U2) and the returns, not shown, of the valves (V1 to V4) are connected with each other and with the outflow line (AL) by means of bores.

Figure 8:
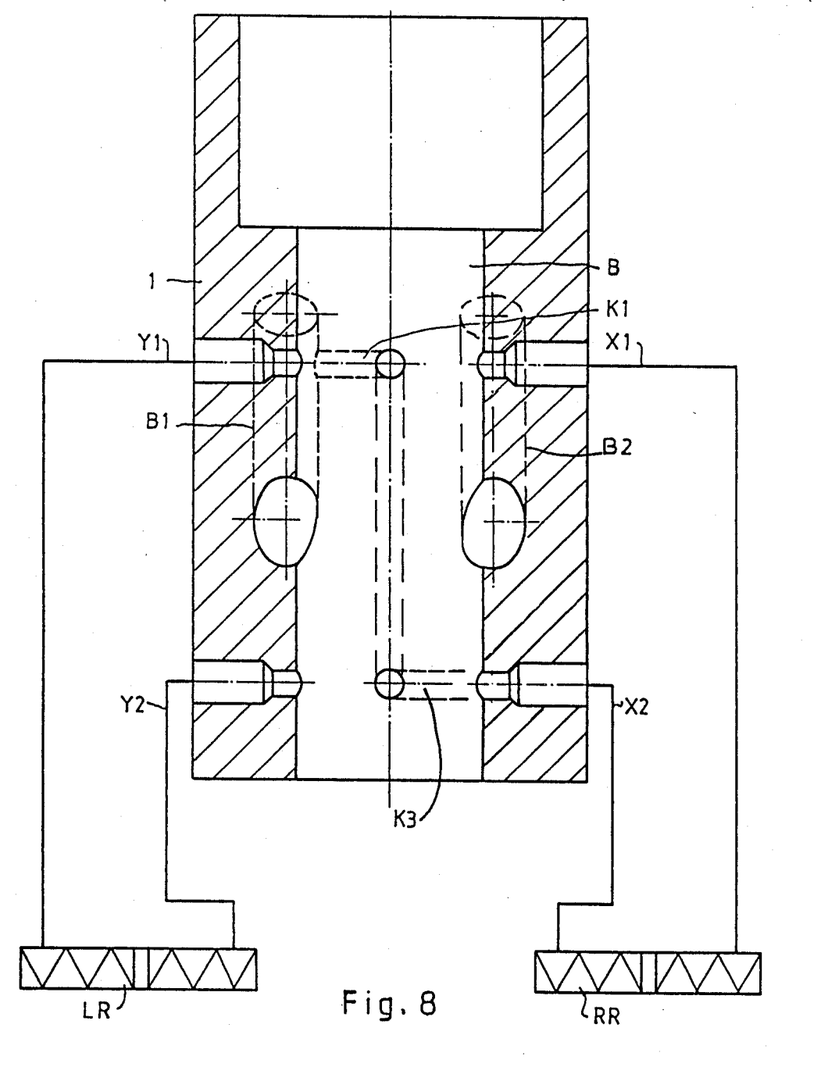
FIG. 8 is an axial section through the steering block along the lines VIII—VIII, turned 90° with respect to FIG. 5.

FIG. 8 is an axial section VIII—VIII through the valve block shown in FIG. 5. The bores (B1, B2), offset against the central axis, which intersect the central bore (B), can be seen. The conduits (K1, K2) form the connections of the control valves with the reversing valves. The control connectors (X1, X2; Y1, Y2) are connected with the schematically shown drives (LR, RR).

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A control device for differential speed steering of a vehicle, comprising:
    a spool valve movable in two directions in each of two degrees of freedom;
    four control valves assigned in pairs to said spool valve;
    reversing valves;
    control connectors connected to outputs of said control valves for regulating the forward and reverse movements of a right and left driving element by means of respective steering and drive control positions of the spool valve via the reversing valves, which cause a steering reversal in a forward-reverse movement sense,
    wherein the spool valve directly activates the reversing valves in accordance with the forward-reverse drive control position and the spool valve is displaceable in one of the degrees of freedom by turning of the steering wheel and in a second of the degrees of freedom by pivoting of a drive lever.

2. A control device in accordance with claim 1, further comprising a geared spindle drive for connecting the steering wheel with the spool valve.

3. A control device in accordance with claim 2, further comprising a linkage for connecting the drive lever with the spool valve.

4. A control device in accordance with claim 3, wherein the reversing valves are formed by valve chambers in the spool valve together with conduits coming from the control valves and leading to outlets towards the control connectors which are located in a steering block which tightly surrounds the spool valve.

5. A control device in accordance with claim 4, wherein the spool valve comprises control bars diagonally disposed with respect to the two directions of the degrees of freedom, further comprising tappets associated with the control bars for the operation of the control valves in such a way that a first one of the control valves is increasingly operated in the forward drive position and in the right turn position, a second one of the control valves is increasingly operated in the forward drive position and in the left turn position, a third one of the control valves is increasingly operated in the reverse drive position and in the left turn position and a fourth one of the control valves is increasingly operated in the reverse drive position and in the right turn position.

6. A control device in accordance with claim 5, wherein in a neutral and a straight ahead steering control position the valve chambers each extend in both directions of the degrss of freedom and the outputs to the forward driving control connectors are each located at limits of the valve chambers of the first and second control valves in relation to the forward-reverse position, and the outputs to the reverse driving control connectors are each located at limits of the valve chambers of the third and fourth control valves in relation to the forward-reverse position, such that in the forward or reverse position the paired assignment of each of the outputs of the control valves to the valve chambers is reversed with respect to each other.

7. A control device in accordance with claim 5, wherein the spool valve is cylindrical and is rotatably and slideably disposed in a cylindrical recess in the steering block, and the valve chambers preferably extend around the spool valve by about 180° and the conduits and the outlets to the control connectors are each offset by 90° with respect to each other and are disposed radially with respect to the valve chambers.

8. A control device in accordance with claim 7, wherein each of the control bars is disposed on the spool valve in the form of two helical sections, preferably with an incline of 45°, and the control valves are disposed from both sides in the direction towards the control bars in the steering block in bores, each of which intersects the cylindrical recess.

9. A control device in accordance with claim 8, wherein the axes of the bores are arranged vertically to the extent of the respective associated control bar.

10. A control device in accordance with claim 8, wherein the tappets are in the shape of sleeves and are disposed axially displaceable in the bores.

11. A control device in accordance with claim 7, wherein the conduits and returns from the control valves are formed by blind bores in the steering block which intersect and are closed towards the outside.

12. A control device in accordance with claim 4, wherein the geared spindle drive is disposed coaxially with the spool valve in the steering block and is rotatably connected with the spool valve on the power take-off side and is secured against rotation in the steering block on the power take-off side.

13. A control device in accordance with claim 12, wherein the geared spindle drive comprises a spring-loaded brake on the power supply side which creates a preset frictional output.

14. A control device in accordance with claim 13, wherein the brake is disposed on a steering column as an annular collar with attached brake ring, and the brake ring and the collar are supported on the inside on a tightly screwed-down lid of the steering block.

15. A control device in accordance with claim 4, wherein the driving linkage acts on a pivot shaft, which extends from the spool valve out of the steering block on the side opposite the geared spindle drive.

16. A control device in accordance with claim 1, wherein a hydraulic pump is connected via throttles with the control connectors and all free chambers and valve returns in the steering block are mutually connected and connected with an outflow and are routed back to the hydraulic pump.

17. A control device in accordance with claim 16, wherein the control connectors are disposed in pairs on spring-loaded differential pressure cylinders.

* * * * *